United States Patent [19]

Falk

[11] Patent Number: 4,521,639
[45] Date of Patent: Jun. 4, 1985

[54] REPEATING THERMOCOUPLE

[76] Inventor: Richard A. Falk, 519 Westminster Dr., Waukesha, Wis. 53186

[21] Appl. No.: 546,967

[22] Filed: Oct. 31, 1983

[51] Int. Cl.³ .................................... H01L 35/02
[52] U.S. Cl. ...................... 136/234; 29/573; 136/242; 374/139
[58] Field of Search ............... 29/573; 136/234, 242; 374/139

[56] References Cited

U.S. PATENT DOCUMENTS 4,396,792  8/1983  Falk .............................. 136/242 X
4,426,484  1/1984  Saeki et al. ..................... 524/541 X Primary Examiner—Leland A. Sebastian

[57] ABSTRACT

Disclosed herein is a repeating use thermocouple assembly and method of making the same in which a cavity adjacent the tip of the thermocouple is filled with a thermosetting foundry sand and baked in place to provide support for the thermocouple tube without causing stresses during use which could cause breakage of the thermocouple tube.

2 Claims, 3 Drawing Figures

REPEATING THERMOCOUPLE

BACKGROUND OF THE INVENTION

The invention relates to a repeating use thermocouple assembly and a method of making the same which provides sufficient protection to the thermocouple element, cold junction and leads to enable repeated measurements with the same assembly. This application is a further development of the subject matter of my U.S. Pat. No. 4,396,792. Although the structure illustrated in the foregoing patent achieved considerable improvements over the prior art, it has been discovered that in some instances molten metal penetrated around the quartz tube and through the refractory fiber wrap, and when the molten metal cooled it cracked the quartz thermocouple tube, preventing further use of the thermocouple assembly. It also was found that packing the refractory fiber around the quartz tube in the cavity could impose stresses on the quartz tube, and when the tube was heated could cause breakage of the thermocouple tube.

SUMMARY OF THE INVENTION

The invention involves use of a thermosetting sand fill baked in place around the quartz tube as a substitute for the refractory fiber packing in the prior art U.S. Pat. No. 4,396,792. When the thermosetting sand is heated during use of the thermocouple assembly in a molten metal bath, the resins burn and do not expand and no added stresses are imposed upon the quartz tube. This has eliminated the breakage associated with the construction illustrated in U.S. Pat. No. 4,396,792.

Further objects, advantages and features of the invention will become apparent from the disclosure.

DESCRIPTION OF THE PREFERRED EMBODIMENT

Figure 3:
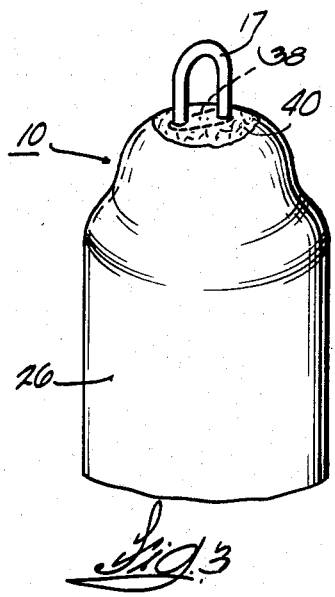
FIG. 3 is a perspective view of the finished repeating use thermocouple.
Figure 1:
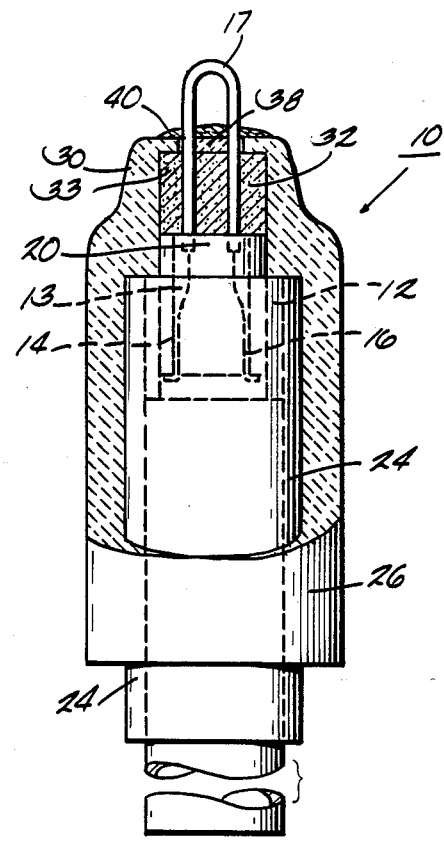
FIG. 1 is a sectional view of the repeating thermocouple of the invention.
Figure 2:
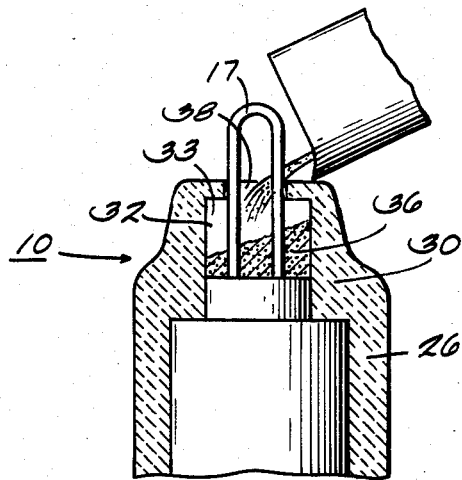
FIG. 2 is a diagram showing the addition of the thermosetting sand in the cavity surrounding the thermocouple.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, the thermocouple assembly 10 in accordance with the invention includes a cardboard or paperboard sleeve 12 which has a connector head 13 for the electrical connector which couples with the lead wires 14 and 16. The U-shaped thermocouple tube 17 is anchored in refractory cement at 20 at the end of the tube 12. Tube 12 is located in a cardboard tube 24. A refractory fiber sleeve 26 has a dome-shaped wall means 30 which defines a cavity 32 having an opening 33 through which the U-shaped thermocouple tube 17 projects.

In manufacture of the thermocouple assembly, the cavity 32 is filled with a thermosetting foundry sand and resin mix 36. A refractory fiber gasket 38 is placed thereover and a ceramic cap 40 is provided. The assembly is then baked to set the sand. The unit is then ready for use.

When the sand-resin mix 36 increases in temperature when the thermocouple assembly 10 is inserted in a molten metal bath, the resin burns or disintegrates but does not expand or contract. Thus no stresses on tube 17 are caused by heating or cooling of the sand fill 36. Hence, breakage of the tube during use is minimized. The sand fill 36 provides stable support for the tube 17 without the disadvantages of prior art constructions.

I claim:

1. In a repeating use immersion thermocouple assembly for a molten metal bath including a support tube, a temperature sensing element having a U-shaped projecting tip with spaced legs and a rigid support means in said cavity for supporting said temperature sensing element and enabling manipulation of the element in a molten metal bath, the improvement comprising a refractory fiber sleeve having a cavity at one end thereof for receiving said U-shaped projecting tip, said U-tube extending through said cavity and a thermosetting sand packing filling said cavity and surrounding said U-shaped tube, and a refractory fiber gasket spanning said open end of said sleeve and refractory cement cap over said gasket and sealing the end of said fiber sleeve around the projecting tip and encasing said refractory fiber gasket.

2. The method of making a usable thermocouple assembly with a refractory fiber sleeve having a slot for the thermocouple tip and a cavity between a thermocouple head and the exposed tip comprising the steps of inserting the thermocouple head in said sleeve with the tip projecting through said slot, filling the cavity surrounding said tube with thermosetting sand, covering the cavity with a refractory fiber gasket, covering the gasket with refractory cement and baking the sand to set the same.

* * * * *